United States Patent
Gabriel et al.

(10) Patent No.: US 11,939,470 B2
(45) Date of Patent: Mar. 26, 2024

(54) SINTER POWDER (SP) COMPRISING A FIRST POLYAMIDE COMPONENT (PA1) AND A SECOND POLYAMIDE COMPONENT (PA2), WHERE THE MELTING POINT OF THE SECOND POLYAMIDE COMPONENT (PA2) IS HIGHER THAN THE MELTING POINT OF THE FIRST POLYAMIDE COMPONENT (PA1)

(71) Applicant: BASF SE, Ludwigshafen am Rhein (DE)

(72) Inventors: Claus Gabriel, Ludwigshafen am Rhein (DE); Thomas Meier, Ludwigshafen am Rhein (DE); Clemens Gottke, Ludwigshafen am Rhein (DE); Angelika Zepp, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 381 days.

(21) Appl. No.: 17/280,715

(22) PCT Filed: Sep. 25, 2019

(86) PCT No.: PCT/EP2019/075840
§ 371 (c)(1),
(2) Date: Mar. 26, 2021

(87) PCT Pub. No.: WO2020/064825
PCT Pub. Date: Apr. 2, 2020

(65) Prior Publication Data
US 2022/0010133 A1 Jan. 13, 2022

(30) Foreign Application Priority Data
Sep. 26, 2018 (EP) .................................. 18196873

(51) Int. Cl.
*C08L 77/06* (2006.01)
*B29C 64/118* (2017.01)
(Continued)

(52) U.S. Cl.
CPC ............ *C08L 77/06* (2013.01); *B29C 64/118* (2017.08); *B29C 64/153* (2017.08); *B33Y 10/00* (2014.12);
(Continued)

(58) Field of Classification Search
None
See application file for complete search history.

(56) References Cited

U.S. PATENT DOCUMENTS 5,663,234 A * 9/1997 Kennedy .............. C08G 81/028
525/123
6,136,948 A 10/2000 Dickens et al.
(Continued)

FOREIGN PATENT DOCUMENTS

| WO | 96/06881 A2 | 3/1996 |
| WO | 2017/140764 A1 | 8/2017 |
| WO | 2018/019727 A1 | 2/2018 |

OTHER PUBLICATIONS

International Preliminary Reporton Patentability received for PCT Patent Application No. PCT/EP2019/075840, dated Sep. 8, 2020, 5 pages.
(Continued)

*Primary Examiner* — Francisco W Tschen
*Assistant Examiner* — Guy F Mongelli
(74) *Attorney, Agent, or Firm* — Faegre Drinker Biddle & Reath LLP

(57) ABSTRACT

The present invention relates to a sinter powder (SP) comprising a first polyamide component (PA1) and a second polyamide component (PA2), where the melting point of the
(Continued)

second polyamide component (PA2) is higher than the melting point of the first polyamide component (PA1). The present invention further relates to a method of producing a shaped body by sintering the sinter powder (SP) or by an FFF (fused filament fabrication) method, and to a shaped body obtainable by the methods of the invention. The present invention further relates to a method of producing the sinter powder (SP).

19 Claims, 1 Drawing Sheet

(51) Int. Cl.
- *B29C 64/153* (2017.01)
- *B29K 77/00* (2006.01)
- *B33Y 10/00* (2015.01)
- *B33Y 70/00* (2020.01)
- *C08L 77/02* (2006.01)
- *C09D 5/03* (2006.01)
- *C09D 177/02* (2006.01)
- *C09D 177/06* (2006.01)

(52) U.S. Cl.
CPC ............... *B33Y 70/00* (2014.12); *C08L 77/02* (2013.01); *C09D 5/031* (2013.01); *C09D 177/02* (2013.01); *C09D 177/06* (2013.01); *B29K 2077/00* (2013.01); *C08L 2205/02* (2013.01)

(56) References Cited

U.S. PATENT DOCUMENTS

2014/0141166 A1* 5/2014 Rodgers ................ B29C 64/118
   427/256
2019/0168450 A1* 6/2019 Gabriel .................. B33Y 70/00

OTHER PUBLICATIONS

International Search Report and Written Opinion received for PCT Patent Application No. PCT/EP2019/075840, dated Dec. 10, 2019, 9 pages.

* cited by examiner

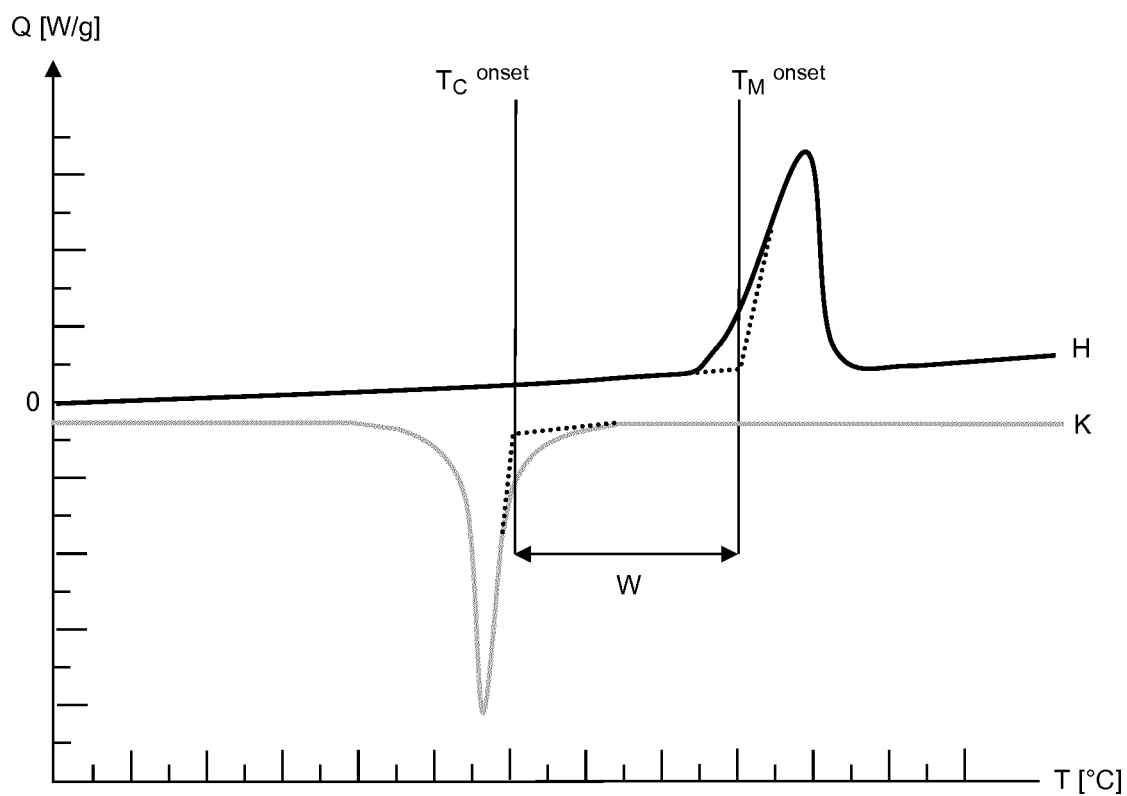

SINTER POWDER (SP) COMPRISING A FIRST POLYAMIDE COMPONENT (PA1) AND A SECOND POLYAMIDE COMPONENT (PA2), WHERE THE MELTING POINT OF THE SECOND POLYAMIDE COMPONENT (PA2) IS HIGHER THAN THE MELTING POINT OF THE FIRST POLYAMIDE COMPONENT (PA1)

CROSS-REFERENCE TO RELATED APPLICATIONS

This application is a national stage application (under 35 U.S.C. § 371) of PCT/EP2019/075840 filed Sep. 25, 2019, which claims benefit of European Application No. 18196873.6, filed Sep. 26, 2018, both of which are incorporated herein by reference in their entirety.

BRIEF DESCRIPTION OF THE FIGURE

FIG. 1 is a differential scanning calorimetry diagram showing a heating run and cooling run with the amount of heat supplied to or removed from the sample plotted as a function of temperature.

The present invention relates to a sinter powder (SP) comprising a first polyamide component (PA1) and a second polyamide component (PA2), where the melting point of the second polyamide component (PA2) is higher than the melting point of the first polyamide component (PA1). The present invention further relates to a method of producing a shaped body by sintering the sinter powder (SP) or by an FFF (fused filament fabrication) method, and to a shaped body obtainable by the methods of the invention. The present invention further relates to a method of producing the sinter powder (SP).

The rapid provision of prototypes is a problem often addressed in very recent times. One process which is particularly suitable for this so-called "rapid prototyping" is selective laser sintering (SLS). This involves selectively exposing to a plastic powder in a chamber with a laser beam. The powder melts; the molten particles coalesce and resolidify. Repeated application of plastic powder and subsequent exposure to a laser allows modeling of three-dimensional shaped bodies.

The process of selective laser sintering for producing shaped bodies from pulverulent polymers is described in detail in patent specifications U.S. Pat. No. 6,136,948 and WO 96/06881.

Selective laser sintering is frequently too time-consuming for the production of a relatively large number of shaped bodies, and so it is possible to produce relatively large volumes of shaped bodies using high-speed sintering (HSS) or "multijet fusion technology" (MJF) from HP. In high-speed sintering, by spray application of an infrared-absorbing ink onto the component cross section to be sintered, followed by exposure with an infrared source, a higher processing speed is achieved compared to selective laser sintering.

The FFF method, which is also referred to as the FDM (fused deposition modeling) method, is a manufacturing method in which a shaped body is produced in layers from a fusible plastic. The shaped body here is generally produced by extrusion of a thermoplastic material through a nozzle. For this purpose, the thermoplastic material is extruded through the nozzle in molten form and transferred into a construction space in which it hardens again. The nozzle is generally heated in order to heat the thermoplastic material to temperatures above the melting point or glass transition temperature and subsequently to deposit it through the nozzle into the construction space in order to produce the three-dimensional shaped body in a method that works layer by layer.

In selective laser sintering, high-speed sintering or what is called multijet fusion technology, the construction space in which the sinter powder (SP) is provided is typically heated. The construction space temperature is typically in the range from 5 to 50 K below the melting temperature ($T_M$) of the sinter powder (SP) in order to minimize the energy input required to melt the sinter powder (SP) in the exposure.

Owing to the upper limit in the processing temperature of laser sintering and high-speed sintering equipment, polyamides having high melting points can be processed only with a high level of complexity in these 3D powder methods. The high-melting polyamides additionally have a tendency for the shaped body not to melt efficiently in the shaped body cross section to be sintered, which can result in component warpage. Owing to the high construction space temperatures, the high-melting polyamides can react even with very small amounts of residual oxygen, which gives shaped bodies having significant brown discoloration.

Low-melting polyamides can typically be processed efficiently since production of the shaped body is possible at lower construction space temperatures. However, the shaped bodies thus obtained frequently show inadequate heat distortion resistance, and so it is not possible to use the shaped bodies for applications in which higher temperatures are required.

The prior art (Mechanical properties of PA6/PA12 blend specimens prepared by selective laser sintering, Polymer Testing 31 (2012) 411-416, doi:10.1016) describes the mechanical properties of shaped bodies that have been produced by selective laser sintering of a polyamide powder. The polyamide powder used is a blend of PA6 and PA12. However, the ultimate strength of the test specimens produced from the powder mixtures is much poorer than the ultimate strength of test specimens that have been produced from pure PA6 powder or pure PA12 powder.

The sinter powder based on nylon-6 and nylon-12 which is described in the prior art can be processed by means of selective laser sintering to give shaped bodies.

It is an object of the present invention to provide an alternative sinter powder (SP). The sinter powder is to be processible at comparatively lower construction space temperatures. The shaped body obtained is additionally to have better heat distortion resistance than shaped bodies obtainable by processing of low-melting polyamides. The shaped bodies produced from the sinter powder are additionally to have better ultimate strengths compared to shaped bodies obtainable from the powder mixtures described in the prior art.

This object is achieved by a sinter powder (SP) comprising the following components:

(A) at least one first polyamide component (PA1) comprising, based on the total weight of the first polyamide component (PA1), at least 50% by weight of a first aliphatic polyamide (aPA1), where the first polyamide component (PA1) has a first melting point ($T_M1$) and where the first aliphatic polyamide (aPA1) has been formed from repeat units having a first ratio (V1) per repeat unit of $CH_2$ groups to NHCO groups in the range from 4 to 6, (B) at least one second polyamide component (PA2) comprising, based on the total weight of the second polyamide component (PA2), at least 50% by weight of a second aliphatic polyamide (aPA2), where the second polyamide component (PA2) has a second melting point ($T_M2$) and where the second aliphatic polyamide (aPA2) has been formed from repeat units having a second ratio (V2) per repeat unit of $CH_2$ groups to NHCO groups in the range from 4 to 6, (C) optionally at least one free-flow aid,
(D) optionally at least one additive and
(E) optionally at least one reinforcer, where the second melting point ($T_M2$) is higher than the first melting point ($T_M1$) and where the quotient (Q) of the numerical value of the second ratio (V2) divided by the numerical value of the first ratio (V1) is in the range from 0.6 to 1.5.

It has been found that, surprisingly, the sinter powder (SP) of the invention can be processed at comparatively low construction space temperatures, giving shaped bodies having comparatively high heat distortion resistance.

The sinter powder (SP) of the invention can additionally be used efficiently in selective laser sintering methods, high-speed sintering methods, multijet fusion methods and fused filament fabrication methods.

The sinter powder (SP) of the invention is elucidated in detail hereinafter.

Sinter Powder (SP)

According to the invention, the sinter powder (SP) comprises at least one first polyamide component (PA1) as component (A), at least one second polyamide component (PA2) as component (B), optionally at least one free-flow aid as component (C), optionally at least one additive as component (D) and optionally at least one reinforcer as component (E).

In the context of the present invention, the terms "component (A)" and "at least one first polyamide component (PA1)" are used synonymously and therefore have the same meaning. The same applies to the terms "component (B)" and "at least one second polyamide component (PA2)". These terms are likewise used synonymously in the context of the present invention and therefore have the same meaning.

Accordingly, the terms "component (C)" and "at least one free-flow aid", "component (D)" and "at least one additive", and "component (E)" and "at least one reinforcer" are also each used synonymously in the context of the present invention and therefore have the same meaning.

In a preferred embodiment, the sinter powder (SP) comprises 5% to 95% by weight of component (A), 5% to 95% by weight of component (B), 0% to 5% by weight of component (C), 0% to 5% by weight of component (D) and 0% to 40% by weight of component (E), based in each case on the total weight of the sinter powder (SP).

The percentages by weight of components (A), (B) and optionally of components (C), (D) and (E) typically add up to 100% by weight.

The present invention thus also provides a sinter powder (SP) according to any of claims 1 to 3, wherein the sinter powder (SP) comprises
5% to 95% by weight of component (A),
5% to 95% by weight of component (B),
0% to 5% by weight of component (C),
0% to 5% by weight of component (D) and
0% to 40% by weight of component (E),
based in each case on the total weight of the sinter powder (SP).

In a particularly preferred embodiment, the sinter powder (SP) comprises 10% to 90% by weight of component (A), 10% to 90% by weight of component (B), 0.1% to 2% by weight of component (C), 0.1% to 2.5% by weight of component (D) and 0% to 40% by weight of component (E), based in each case on the total weight of the sinter powder (SP).

The present invention thus also provides a sinter powder (SP), wherein the sinter powder (SP) comprises
10% to 90% by weight of component (A),
10% to 90% by weight of component (B),
0.1% to 1% by weight of component (C),
0.1% to 2.5% by weight of component (D) and
0% to 40% by weight of component (E),
based in each case on the total weight of the sinter powder (SP).

In an especially preferred embodiment, the sinter powder (SP) comprises 20% to 80% by weight of component (A), 80% to 20% by weight of component (B), 0.1% to 1% by weight of component (C), 0.1% to 2% by weight of component (D) and 0% to 40% by weight of component (E), based in each case on the total weight of the sinter powder (SP).

In a most preferred embodiment, the sinter powder (SP) comprises 25% to 75% by weight of component (A), 75% to 25% by weight of component (B), 0.1% to 0.5% by weight of component (C), 0.1% to 1.5% by weight of component (D) and 0% to 40% by weight of component (E), based in each case on the total weight of the sinter powder (SP).

The sinter powder (SP) comprises particles. These particles have, for example, a size (D50) in the range from 10 to 250 µm, preferably in the range from 15 to 200 µm, more preferably in the range from 20 to 120 µm and especially preferably in the range from 20 to 110 µm.

The sinter powder (SP) of the invention has, for example,
a D10 in the range from 10 to 60 µm,
a D50 in the range from 25 to 90 µm and
a D90 in the range from 50 to 150 µm.

Preferably, the sinter powder (SP) of the invention has
a D10 in the range from 20 to 50 µm,
a D50 in the range from 40 to 90 µm and
a D90 in the range from 80 to 125 µm.

The present invention therefore also provides a process in which the sinter powder (SP) has
a D10 in the range from 10 to 60 µm,
a D50 in the range from 25 to 90 µm and
a D90 in the range from 50 to 150 µm.

The present invention therefore also provides a sinter powder (SP) having a median particle size ($D_{50}$) in the range from 10 to 250 µm.

In the context of the present invention, the "D10" is understood to mean the particle size at which 10% by volume of the particles based on the total volume of the particles are smaller than or equal to D10 and 90% by volume of the particles based on the total volume of the particles are larger than D10. By analogy, the "D50" is understood to mean the particle size at which 50% by volume of the particles based on the total volume of the particles are smaller than or equal to D50 and 50% by volume of the particles based on the total volume of the particles are larger than D50. Correspondingly, the "D90" is understood to mean the particle size at which 90% by volume of the particles based on the total volume of the particles are smaller than or equal to D90 and 10% by volume of the particles based on the total volume of the particles are larger than D90.

To determine the particle sizes, the sinter powder (SP) is suspended in a dry state using compressed air or in a solvent, for example water or ethanol, and this suspension is analyzed. The D10, D50 and D90 values are determined by laser diffraction using a Malvern Mastersizer 3000. Evaluation is by means of Fraunhofer diffraction.

The sinter powder (SP) typically has a first melting point ($T_M1$) in the range from 150 to 280° C. Preferably, the melting temperature ($T_M1$) of the sinter powder (SP) is in the range from 160 to 270° C. and especially preferably in the range from 170 to 265° C.

The sinter powder (SP) typically has a second melting point ($T_M2$) in the range from 170 to 300° C. Preferably, the melting temperature ($T_M2$) of the sinter powder (SP) is in the range from 180 to 310° C. and especially preferably in the range from 190 to 300° C.

The melting points ($T_M1$) and ($T_M2$) are determined in the context of the present invention by means of differential scanning calorimetry (DSC). Typically, a heating run (H) and a cooling run (C) are measured, each at a heating rate/cooling rate of K/min. This affords a DSC diagram as shown by way of example in FIG. 1. The melting temperature ($T_M$) is then understood to mean the temperature at which the melting peak of the heating run (H) of the DSC diagram has a maximum.

The sinter powder (SP) typically also has a first crystallization temperature ($T_C1$) in the range from 130 to 260° C. Preferably, the first crystallization temperature ($T_C1$) of the sinter powder (SP) is in the range from 140 to 250° C. and especially preferably in the range from 145 to 245° C.

The sinter powder (SP) typically also has a second crystallization temperature ($T_C2$) in the range from 150 to 300° C. Preferably, the second crystallization temperature ($T_C1$) of the sinter powder (SP) is in the range from 160 to 290° C. and especially preferably in the range from 165 to 285° C.

The crystallization temperatures ($T_C1$) and ($T_C2$) are determined in the context of the present invention by means of differential scanning calorimetry (DSC). This typically involves measuring a heating run (H) and a cooling run (C), each at a heating rate and a cooling rate of 20 K/min. This affords a DSC diagram as shown by way of example in FIG. 1. The crystallization temperature ($T_C$) is then the temperature at the minimum of the crystallization peak of the DSC curve.

The sinter powder (SP) also typically has a sintering window ($W_{SP}$), with reference to the second melting point ($T_M2$) of the second polyamide component (PA2) present in the sinter powder (SP). The sintering window ($W_{SP}$) is, as described below, the difference between the onset temperature of melting ($T_{M2}^{onset}$) and the onset temperature of crystallization ($T_{C2}^{onset}$). The onset temperature of melting ($T_{M2}^{onset}$) and the onset temperature of crystallization ($T_{C2}^{onset}$) are determined as described below.

The sintering window ($W_{SP}$) of the sinter powder (SP) is, for example, in the range from to 40 K (kelvin), more preferably in the range from 15 to 35 K and especially preferably in the range from 18 to 30 K.

The sinter powder (SP) can be produced by any methods known to those skilled in the art. The sinter powder (SP) is preferably produced by grinding.

Suitable mills include all mills known to those skilled in the art, for example classifier mills, opposed jet mills, hammer mills, ball mills, vibratory mills or rotor mills such as pinned disk mills and whirlwind mills.

The grinding in the mill can likewise be effected by any methods known to those skilled in the art. For example, the grinding can take place under inert gas and/or while cooling with liquid nitrogen. Cooling with liquid nitrogen is preferred. The temperature in the grinding is as desired; the grinding is preferably performed at liquid nitrogen temperatures, for example at a temperature in the range from −210 to −195° C. The temperature of the components on grinding in that case is, for example, in the range from −40 to −30° C.

The grinding can be conducted by any methods known to those skilled in the art; for example, components (A), (B) and (C) and optionally (D), (E) and (F) are introduced into a mill and ground therein.

In one embodiment, the components are first mixed with one another and then ground. The method of producing the sinter powder (SP) in that case preferably comprises the steps of a1) mixing the following components:
  (A) at least one first polyamide component (PA1),
  (B) at least one second polyamide component (PA2),
  (D) optionally at least one additive and
  (E) optionally at least one reinforcer,
b1) grinding the mixture obtained in step a) to obtain the sinter powder (SP).

In a preferred embodiment, component (C) is mixed with the sinter powder (SP) after the grinding.

In a preferred embodiment, the first polyamide component (PA1) and the second polyamide component (PA2) are provided separately from one another and mixed subsequently. The present invention thus also provides a method of producing the sinter powder (SP), comprising the steps of
a) providing the first polyamide component (PA1)
b) providing the second polyamide component (PA2)
c) mixing the first polyamide component (PA1) and the second polyamide component (PA2).

In a preferred embodiment, the first polyamide component (PA1) and the second polyamide component (PA2) are both provided in pulverulent form and subsequently mixed in dry form (dry blend). The particle size of the first polyamide component (PA1) and the second polyamide component (PA2) is preferably within the particle size range of the sinter powder (SP), and so the details and preferences given with respect to the sinter powder (SP) are correspondingly applicable to the first polyamide component (PA1) and the second polyamide component (PA2).

The first polyamide component (PA1) is provided in method step a) preferably by grinding, with regard to which the details and preferences given above are correspondingly applicable. The second polyamide component (PA2) is likewise provided in method step b) preferably by grinding, and so the details and preferences given above are correspondingly applicable thereto as well.

If the sinter powder (SP) comprises components (D) and (E), in a preferred embodiment, these are mixed into the first polyamide component (PA1) and/or into the second polyamide component (PA2), preferably in a twin-screw extruder. The amounts of any components (D) and (E) mixed in are chosen such that the finished sinter powder (SP) comprises the above-described amounts of components (D) and (E).

In a particularly preferred embodiment, the first polyamide component (PA1) is provided in method step a) by mixing the first polyamide component (PA1) with component (D) and optionally component (E) in a twin-screw extruder and subsequently grinding, which affords a first powder (P1), which is subsequently mixed with component (C), and the second polyamide component (PA2) is provided by mixing the second polyamide component (PA2) with component (D) and optionally component (E) in a twin-screw extruder with subsequent grinding, giving a second powder (P2), which is subsequently mixed with component (C). The powders (P1) and (P2) obtained in method steps a)

and b) are preferably subsequently mixed in dry form in method step c), which affords the sinter powder (SP).

For the grinding in method steps a) and b), the details and preferences described above are correspondingly applicable.

Component (A)

According to the invention, component (A) is at least one first polyamide component (PA1). In the context of the present invention, the terms "component (A)" and "at least one first polyamide component (PA1)" are used synonymously and therefore have the same meaning. In the context of the present invention, "at least one first polyamide component (PA1)" means either exactly one first polyamide component (PA1) or mixtures of two or more first polyamide components (PA1). Preferably, component (A) is exactly one first polyamide component (PA1).

The at least one first polyamide component (PA1) comprises, based on the total weight of the first polyamide component (PA1), at least 50% by weight of a first aliphatic polyamide (aPA1). The first aliphatic polyamide (aPA1) is formed from repeat units having a first ratio (V1) per repeat unit of $CH_2$ groups to NHCO groups in the range from 4 to 6.

The person skilled in the art is aware that aliphatic polyamides are formed from repeat units having $CH_2$ groups and NHCO groups. For example, nylon-6,6 has the following repeat unit (base unit):

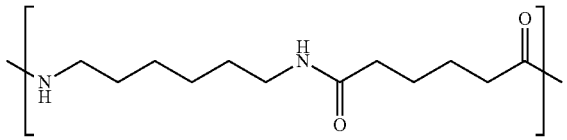

Nylon-6,6 thus comprises, in a base unit, 10 $CH_2$ groups and 2 NHCO groups, resulting in a ratio of $CH_2$ groups to NHCO groups of 5 for PA 66.

The table which follows shows, by way of example, the ratios of $CH_2$ groups to NHCO groups for a number of polyamides.

| Polyamide | $CH_2$/NHCO |
|---|---|
| 4 | 3 |
| 46 | 4 |
| 5 | 4 |
| 6 | 5 |
| 66 | 5 |
| 7 | 6 |
| 8 | 7 |
| 9 | 8 |
| 69 | 6.5 |
| 610 | 7 |
| 612 | 8 |
| 10 | 9 |
| 11 | 10 |
| 12 | 11 |

The first polyamide component (PA1) has a first melting point ($T_M1$) lower than the second melting point ($T_M2$) of the second polyamide component (PA2). The first melting point ($T_M1$) is preferably 20 to 70 K lower than the second melting point ($T_M2$).

Preferably, the first melting point ($T_M1$) is in the range from 150 to 280° C., more preferably in the range from 170 to 270° C. and especially preferably in the range from 175 to 265° C., determined to ISO 11357-3:2014.

Suitable first polyamide components (PA1) have a weight-average molecular weight ($M_{W(PA1)}$) in the range from 500 to 2 000 000 g/mol, preferably in the range from 10 000 to 90 000 g/mol and especially preferably in the range from 20 000 to 70 000 g/mol.

The weight-average molecular weight ($M_{W(PA1)}$) is determined by means of SEC-MALLS (Size Exclusion Chromatography-Multi-Angle Laser Light Scattering) according to Chi-san Wu "Handbook of size exclusion chromatography and related techniques", page 19.

Examples of suitable first aliphatic polyamides (aPA1) are aliphatic polyamides that derive from lactams having 5 to 7 ring members. Examples of first aliphatic polyamides (aPA1) derived from lactams include polyamides that derive from polycaprolactam and/or polyenantholactam (poly-1-aza-2-cyclooctanones), preference being given to polycaprolactam.

A preferred first aliphatic polyamide (aPA1) is at least one aliphatic polyamide selected from the group consisting of PA 5, PA 6/66, PA 6 and PA 66/6.

PA 6/66 preferably has a proportion of 60% to 95% by weight of caprolactam units, based on the total weight of PA 6/66. Nylon-66/6 preferably has 5% to 40% by weight of caprolactam units, based on the total weight of the PA 66/6.

The first aliphatic polyamide (aPA1) is preferably at least one aliphatic polyamide selected from the group consisting of PA 6, PA 6/66 and PA 66/6.

Nylon-6/66 preferably has a melting point in the range from 185 to 205° C. Nylon-6 preferably has a melting point in the range from 211 to 229° C. Nylon-66/6 preferably has a melting point from 221 to 239° C.

The first ratio (V1) of $CH_2$ groups to NHCO groups in the first aliphatic polyamide (aPA1) is preferably in the range from 4.5 to 5.5, particularly preferably in the range from 4.8 to 5.2, more preferably in the range from 4.9 to 5.1 and especially preferably in the range from 4.95 to 5.05.

The first polyamide component (PA1) comprises preferably 50% to 90% by weight of the first aliphatic polyamide (aPA1), more preferably 60% to 80% by weight of the first aliphatic polyamide (aPA1), based in each case on the total weight of the first polyamide component (PA1).

Preferably, the first polyamide component (PA1) comprises 50% to 90% by weight, preferably 60% to 80% by weight, of the first aliphatic polyamide (aPA1) and 10% to 50% by weight, preferably 20% to 40% by weight, of a first (semi)aromatic polyamide (arPA1), based in each case on the total weight of the first polyamide component (PA1).

Preferably, the first (semi)aromatic polyamide (arPA1) is an amorphous polyamide. Further preferably, the (semi) aromatic polyamide (arPA1) is at least one (semi)aromatic polyamide selected from the group consisting of PA 6I/6T, PA 6I and PA 6/3T, particular preference being given to PA 6I/6T.

Component (B)

According to the invention, component (B) is at least one second polyamide component (PA2). In the context of the present invention, the terms "component (B)" and "at least one second polyamide component (PA2)" are used synonymously and therefore have the same meaning. In the context of the present invention, "at least one second polyamide component (PA2)" means either exactly one second polyamide component (PA2) or mixtures of two or more second polyamide components (PA2). Preferably, component (B) is exactly one second polyamide component (PA2).

The second polyamide component (PA2) is different than component (PA1). The second aliphatic polyamide (aPA1) is different than the first aliphatic polyamide (aPA1).

The second polyamide component (PA2) has a second melting point ($T_M2$) higher than the first melting point ($T_M1$) of the first polyamide component (PA1). The second melting point ($T_M2$) is preferably 20 to 70 K higher than the first melting point ($T_M1$) of the first polyamide component.

The second melting point ($T_M2$) is preferably in the range from 170 to 300° C., determined to ISO 11357-3:2014.

Suitable second polyamide components (PA2) have a weight-average molecular weight ($M_{W(PA2)}$) in the range from 500 to 2 000 000 g/mol, preferably in the range from 000 to 90 000 g/mol and especially preferably in the range from 20 000 to 70 000 g/mol. The weight-average molecular weight ($M_{W(PA2)}$) is determined by means of SEC-MALLS (Size Exclusion Chromatography-Multi-Angle Laser Light Scattering) according to Chi-san Wu "Handbook of size exclusion chromatography and related techniques", page 19.

A preferred second aliphatic polyamide (aPA2) is at least one aliphatic polyamide selected from the group consisting of PA 46, PA 5, PA 6, PA 66/6 and PA 66. PA46 preferably has a melting point in the range from 285 to 290° C.

The second aliphatic polyamide (aPA2) is preferably at least one aliphatic polyamide selected from the group consisting of PA 6, PA 66/6 and PA 66.

Nylon-6,6 preferably has a melting point in the range from 250 to 270° C.

The second ratio (V2) is preferably in the range from 4.5 to 5.5, particularly preferably in the range from 4.8 to 5.2, more preferably in the range from 4.9 to 5.1 and especially preferably in the range from 4.95 to 5.05. According to the invention, the quotient (Q) of numerical value of second ratio (V2) divided by numerical value of first ratio (V1) is in the range from 0.6 to 1.5, preferably in the range from 0.8 to 1.2, particularly preferably in the range from 0.9 to 1.1, more preferably in the range from 0.96 to 1.04 and especially preferably in the range from 0.98 to 1.02.

The quotient (Q) is defined by the following mathematical formula:

$$Q = \frac{V2}{V1}$$

The at least one second polyamide component (PA2) comprises, based on the total weight of the second polyamide component (PA2), at least 50% by weight of a second aliphatic polyamide (aPA2) having a second melting point ($T_M2$). The second aliphatic polyamide (aPA2) is formed from repeat units having a second ratio (V2) per repeat unit of $CH_2$ groups to NHCO groups in the range from 4 to 6. The second polyamide component (PA2) comprises preferably 50% to 100% by weight of the second aliphatic polyamide (aPA2), more preferably 60% to 100% by weight of the second aliphatic polyamide (aPA2), based in each case on the total weight of the second polyamide component (PA2).

Preferably, the second polyamide component (PA2) comprises 50% to 90% by weight, preferably 60% to 80% by weight, of the second aliphatic polyamide (aPA2) and 10% to 50% by weight, preferably 20% to 40% by weight, of a second (semi)aromatic polyamide (arPA2), based in each case on the total weight of the second polyamide component (PA2).

Preferably, the second (semi)aromatic polyamide (arPA2) is an amorphous polyamide. Further preferably, the second (semi)aromatic polyamide (arPA2) is at least one (semi) aromatic polyamide selected from the group consisting of PA 6I/6T, PA 6I and PA 6/3T, particular preference being given to PA 6I/6T. Preferably, the second polyamide component (PA2) is the same (semi)aromatic polyamide as the first polyamide component (PA1). In this embodiment, second (semi)aromatic polyamide (arPA2) first (semi)aromatic polyamide (arPA1) are identical.

The present invention thus also further provides a sinter powder (SP), wherein the first polyamide component (PA1) comprises 50% to 90% by weight of the first aliphatic polyamide (aPA1) selected from the group consisting of PA6/66, PA6 and PA66/6 and 10% to 50% by weight of a first (semi)aromatic polyamide (arPA1), based on the total weight of the first polyamide component (PA1), and the second polyamide component (PA2) comprises 50% to 90% by weight of the second aliphatic polyamide (aPA2) selected from the group consisting of PA6, PA66/6 and PA66 and 10% to 50% by weight of a second (semi)aromatic polyamide (arPA2), based on the total weight of the second polyamide component (PA2).

In a further preferred embodiment, the second polyamide component (PA2) does not comprise any (semi)aromatic polyamide (arPA2).

Component (C)

According to the invention, component (C) is at least one free-flow aid. In the context of the present invention, the terms "component (C)" and "at least one free-flow aid" are used synonymously and therefore have the same meaning. In the context of the present invention, "at least one free-flow aid" means either exactly one free-flow aid or mixtures of two or more free-flow aids. If the sinter powder (SP) comprises component (C), component (C) is preferably exactly one free-flow aid or a mixture of two free-flow aids.

Suitable free-flow aids are, for example, silicas or aluminas. An example of a suitable alumina is Aeroxide® Alu C from Evonik.

Component (D)

Component (D) is at least one additive.

In the context of the present invention, "at least one additive" means either exactly one additive or a mixture of two or more additives.

Additives as such are known to those skilled in the art. For example, the at least one additive is selected from the group consisting of antinucleating agents, stabilizers, conductive additives, end group functionalizers, dyes, antioxidants (preferably sterically hindered phenols) and color pigments.

The present invention therefore also provides a method in which component (D) is selected from the group consisting of antinucleating agents, stabilizers, conductive additives, end group functionalizers, dyes, antioxidants (preferably sterically hindered phenols) and color pigments.

An example of a suitable antinucleating agent is lithium chloride. Suitable stabilizers are, for example, phenols, phosphites and copper stabilizers. Suitable conductive additives are carbon fibers, metals, stainless steel fibers, carbon nanotubes and carbon black. Suitable end group functionalizers are, for example, terephthalic acid, adipic acid and propionic acid. Suitable dyes and color pigments are, for example, carbon black and iron chromium oxides.

Suitable antioxidants are, for example, Irganox® 245 or Irganox® 1098 from BASF SE.

If the sinter powder comprises component (D), it comprises at least 0.1% by weight of component (D), preferably at least 0.2% by weight of component (D), based on the sum total of the proportions by weight of components (A), (B), (C), (D) and (E), preferably based on the total weight of the sinter powder (SP).

Component (E)

According to the invention, any component (E) present is at least one reinforcer.

In the context of the present invention, "at least one reinforcer" means either exactly one reinforcer or a mixture of two or more reinforcers.

In the context of the present invention, a reinforcer is understood to mean a material that improves the mechanical properties of shaped bodies produced by the process of the invention compared to shaped bodies that do not comprise the reinforcer.

Reinforcers as such are known to those skilled in the art. Component (E) may, for example, be in spherical form, in platelet form or in fibrous form.

Preferably, the at least one reinforcer is in platelet form or in fibrous form.

A "fibrous reinforcer" is understood to mean a reinforcer in which the ratio of length of the fibrous reinforcer to the diameter of the fibrous reinforcer is in the range from 2:1 to 40:1, preferably in the range from 3:1 to 30:1 and especially preferably in the range from 5:1 to 20:1, where the length of the fibrous reinforcer and the diameter of the fibrous reinforcer are determined by microscopy by means of image evaluation on samples after ashing, with evaluation of at least 70 000 parts of the fibrous reinforcer after ashing.

The length of the fibrous reinforcer in that case is typically in the range from 5 to 1000 µm, preferably in the range from 10 to 600 µm and especially preferably in the range from 20 to 500 µm, determined by means of microscopy with image evaluation after ashing.

The diameter in that case is, for example, in the range from 1 to 30 µm, preferably in the range from 2 to 20 µm and especially preferably in the range from 5 to 15 µm, determined by means of microscopy with image evaluation after ashing.

In a further preferred embodiment, the at least one reinforcer is in platelet form. In the context of the present invention, "in platelet form" is understood to mean that the particles of the at least one reinforcer have a ratio of diameter to thickness in the range from 4:1 to 10:1, determined by means of microscopy with image evaluation after ashing.

Suitable reinforcers are known to those skilled in the art and are selected, for example, from the group consisting of carbon nanotubes, carbon fibers, boron fibers, glass fibers, glass beads, silica fibers, ceramic fibers, basalt fibers, aluminosilicates, aramid fibers and polyester fibers.

The present invention therefore also provides a method in which component (E) is selected from the group consisting of carbon nanotubes, carbon fibers, boron fibers, glass fibers, glass beads, silica fibers, ceramic fibers, basalt fibers, aluminosilicates, aramid fibers and polyester fibers.

The at least one reinforcer is preferably selected from the group consisting of aluminosilicates, glass fibers, glass beads, silica fibers and carbon fibers.

The at least one reinforcer is more preferably selected from the group consisting of aluminosilicates, glass fibers, glass beads and carbon fibers. These reinforcers may additionally have been amino-functionalized.

Suitable silica fibers are, for example, wollastonite.

Suitable aluminosilicates are known as such to the person skilled in the art. Aluminosilicates refer to compounds comprising $Al_2O_3$ and $SiO_2$. In structural terms, a common factor among the aluminosilicates is that the silicon atoms are tetrahedrally coordinated by oxygen atoms and the aluminum atoms are octahedrally coordinated by oxygen atoms. Aluminosilicates may additionally comprise further elements.

Preferred aluminosilicates are sheet silicates. Particularly preferred aluminosilicates are calcined aluminosilicates, especially preferably calcined sheet silicates. The aluminosilicate may additionally have been amino-functionalized.

If the at least one reinforcer is an aluminosilicate, the aluminosilicate may be used in any form. For example, it can be used in the form of the pure aluminosilicate, but it is likewise possible that the aluminosilicate is used in mineral form. Preferably, the aluminosilicate is used in mineral form. Suitable aluminosilicates are, for example, feldspars, zeolites, sodalite, sillimanite, andalusite and kaolin. Kaolin is a preferred aluminosilicate.

Kaolin is one of the clay rocks and comprises essentially the mineral kaolinite. The empirical formula of kaolinite is $Al_2[(OH)_4/Si_2O_5]$. Kaolinite is a sheet silicate. As well as kaolinite, kaolin typically also comprises further compounds, for example titanium dioxide, sodium oxides and iron oxides. Kaolin preferred in accordance with the invention comprises at least 98% by weight of kaolinite, based on the total weight of the kaolin.

If the sinter powder comprises component (E), it comprises preferably at least 10% by weight of component (E), based on the sum total of the percentages by weight of components (A), (B), (C), (D) and (E), preferably based on the total weight of the sinter powder (SP).

The present invention also provides a method of producing a shaped body, comprising the steps of:
is) providing a layer of the sinter powder (SP),
iis) exposing the layer of the sinter powder (SP) provided in step is) in order to form the shaped body.

Step is)

In step is), a layer of the sinter powder (SP) is provided.

The layer of the sinter powder (SP) can be provided by any methods known to those skilled in the art. Typically, the layer of the sinter powder (SP) is provided in a construction space on a construction platform. The temperature of the construction space may optionally be controlled.

The construction space has, for example, a temperature in the range from 1 to 100 K (kelvin) below the first melting point $(T_M 1)$ of the sinter powder (SP), preferably a temperature in the range from 5 to 50 K below the first melting point $(T_M 1)$ of the sinter powder (SP), and especially preferably a temperature in the range from 10 to 25 K below the first melting point $(T_M 1)$ of the sinter powder (SP).

The construction space has, for example, a temperature in the range from 150 to 250° C., preferably in the range from 160 to 230° C. and especially preferably in the range from 165 to 210° C.

The layer of the sinter powder (SP) can be provided by any methods known to those skilled in the art. For example, the layer of the sinter powder (SP) is provided by means of a coating bar or a roll in the thickness to be achieved in the construction space.

The thickness of the layer of the sinter powder (SP) which is provided in step is) may be as desired. For example, it is in the range from 50 to 300 µm, preferably in the range from 70 to 200 µm and especially preferably in the range from 90 to 150 µm.

Step iis)

In step iis), the layer of the sinter powder (SP) provided in step is) is exposed.

On exposure, at least some of the layer of the sinter powder (SP) melts. The molten sinter powder (SP) coalesces and forms a homogeneous melt. After the exposure, the molten part of the layer of the sinter powder (SP) cools down again and the homogeneous melt solidifies again.

Suitable methods of exposure include all methods known to those skilled in the art. Preferably, the exposure in step iis) is effected with a radiation source. The radiation source is preferably selected from the group consisting of infrared sources and lasers. Especially preferred infrared sources are near infrared sources.

The present invention therefore also provides a method in which the exposing in step iis) is effected with a radiation source selected from the group consisting of lasers and infrared sources.

Suitable lasers are known to those skilled in the art and are for example fiber lasers, Nd:YAG lasers (neodymium-doped yttrium aluminum garnet laser) or carbon dioxide lasers. The carbon dioxide laser typically has a wavelength of 10.6 µm.

If the radiation source used in the exposing in step iis) is a laser, the layer of the sinter powder (SP) provided in step is) is typically exposed locally and briefly to the laser beam. This selectively melts just the parts of the sinter powder (SP) that have been exposed to the laser beam. If a laser is used in step iis), the method of the invention is also referred to as selective laser sintering. Selective laser sintering is known per se to those skilled in the art.

If the radiation source used in the exposing in step iis) is an infrared source, especially a near infrared source, the wavelength at which the radiation source radiates is typically in the range from 780 nm to 1000 µm, preferably in the range from 780 nm to 50 µm and especially in the range from 780 nm to 2.5 µm.

In the exposing in step iis), in that case, the entire layer of the sinter powder (SP) is typically exposed. In order that only the desired regions of the sinter powder (SP) melt in the exposing, an infrared-absorbing ink (IR-absorbing ink) is typically applied to the regions that are to melt.

The method of producing the shaped body in that case preferably comprises, between step is) and step iis), a step is-1) of applying at least one IR-absorbing ink to at least part of the layer of the sinter powder (SP) provided in step is).

The present invention therefore also further provides a method of producing a shaped body, comprising the steps of
is) providing a layer of a sinter powder (SP),
is-1) applying at least one IR-absorbing ink to at least part of the layer of the sinter powder (SP) provided in step is),
iis) exposing the layer of the sinter powder (SP) provided in step i) to which the IR-absorbing ink has been applied.

Suitable IR-absorbing inks are all IR-absorbing inks known to those skilled in the art, especially IR-absorbing inks known to those skilled in the art for high-speed sintering.

IR-absorbing inks typically comprise at least one absorber that absorbs IR radiation, preferably NIR radiation (near infrared radiation). In the exposing of the layer of the sinter powder (SP) in step iis), the absorption of the IR radiation, preferably the NIR radiation, by the IR absorber present in the IR-absorbing inks results in selective heating of the part of the layer of the sinter powder (SP) to which the IR-absorbing ink has been applied.

The IR-absorbing ink may, as well as the at least one absorber, comprise a carrier liquid. Suitable carrier liquids are known to those skilled in the art and are, for example, oils or solvents.

The at least one absorber may be dissolved or dispersed in the carrier liquid.

If the exposing in step iis) is effected with a radiation source selected from infrared sources and if step is-1) is conducted, the method of the invention is also referred to as high-speed sintering (HSS) or multijet fusion (MJF) method. These methods are known per se to those skilled in the art.

After step iis), the layer of the sinter powder (SP) is typically lowered by the layer thickness of the layer of the sinter powder (SP) provided in step is) and a further layer of the sinter powder (SP) is applied. This is subsequently exposed again in step iis).

This firstly bonds the upper layer of the sinter powder (SP) to the lower layer of the sinter powder (SP); in addition, the particles of the sinter powder (SP) within the upper layer are bonded to one another by fusion.

In the process of the invention, steps is) and iis) and optionally is-1) can thus be repeated.

By repeating the lowering of the powder bed, the applying of the sinter powder (SP) and the exposure and hence the melting of the sinter powder (SP), three-dimensional shaped bodies are produced. It is possible to produce shaped bodies that also have cavities, for example. No additional support material is necessary since the unmolten sinter powder (SP) itself acts as a support material.

The present invention also further provides a method of producing a shaped body, comprising the steps of:
if) melting the sinter powder (SP)
iif) depositing the molten sinter powder (SP) in a construction space in order to form the shaped body.

This method is also referred to as the FFF (fused filament fabrication) method. In this method, the shaped body is produced layer by layer from a meltable plastic. The shaped body here is generally produced by extrusion of the sinter powder (SP) in the molten state through a nozzle. For this purpose, the sinter powder (SP) is melted in method step if) and preferably extruded through a nozzle and transferred into a construction space in which it hardens again. In a further preferred embodiment, in step if), the sinter powder (SP) is first melted in an extruder and extruded to form a strand. This strand is preferably subsequently melted again in the nozzle. The nozzle is generally heated in order to heat the sinter powder (SP) to temperatures above the second melting point ($T_M2$) and subsequently preferably to deposit it through the nozzle into the construction space in order to produce the three-dimensional shaped body in a method that works layer by layer. Steps if) and iif) are generally repeated until the shaped body is complete.

The present invention also further provides for the use of the sinter powder (SP) by in a sintering method or in a fused filament fabrication method.

The present invention therefore also further provides a shaped body obtainable by the methods of the invention.

Of particular significance in the methods of the invention is the melting range of the sinter powder (SP), called the sintering window ($W_{SP}$) of the sinter powder (SP), with reference in accordance with the invention to the second melting point ($T_M2$).

The sintering window ($W_{SP}$) of the sinter powder (SP) can be determined by differential scanning calorimetry (DSC) for example.

In differential scanning calorimetry, the temperature of a sample, i.e. in the present case a sample of the sinter powder (SP), and the temperature of a reference are altered linearly over time. For this purpose, heat is supplied to/removed from the sample and the reference. The amount of heat Q necessary to keep the sample at the same temperature as the reference is determined. The amount of heat QR supplied to/removed from the reference serves as a reference value.

If the sample undergoes an endothermic phase transformation, an additional amount of heat Q must be supplied to keep the sample at the same temperature as the reference. If an exothermic phase transformation takes place, an amount of heat Q has to be removed to keep the sample at the same temperature as the reference. The measurement affords a DSC diagram in which the amount of heat Q supplied to/removed from the sample is plotted as a function of temperature T.

Measurement typically involves initially performing a heating run (H), i.e. the sample and the reference are heated in a linear manner. During the melting of the sample (solid/liquid phase transformation), an additional amount of heat Q has to be supplied to keep the sample at the same temperature as the reference. In the DSC diagram, a peak known as the melting peak is then observed.

After the heating run (H), a cooling run (C) is typically measured. This involves cooling the sample and the reference linearly, i.e. heat is removed from the sample and the reference. During the crystallization/solidification of the sample (liquid/solid phase transformation), a greater amount of heat Q has to be removed to keep the sample at the same temperature as the reference, since heat is liberated in the course of crystallization/solidification. In the DSC diagram of the cooling run (C), a peak, called the crystallization peak, is then observed in the opposite direction from the melting peak.

In the context of the present invention, the heating during the heating run is typically effected at a heating rate of 20 K/min. The cooling during the cooling run in the context of the present invention is typically effected at a cooling rate of 20 K/min.

A DSC diagram comprising a heating run (H) and a cooling run (C) is depicted by way of example in FIG. 1. The DSC diagram can be used to determine the onset temperature of melting ($T_{M2}^{onset}$) and the onset temperature of crystallization ($T_{C2}^{onset}$).

To determine the onset temperature of melting ($T_{M2}^{onset}$), a tangent is drawn against the baseline of the heating run (H) at the temperatures below the melting peak. A second tangent is drawn against the first point of inflection of the melting peak at temperatures below the temperature at the maximum of the melting peak. The two tangents are extrapolated until they intersect. The vertical extrapolation of the intersection to the temperature axis denotes the onset temperature of melting ($T_{M2}^{onset}$).

To determine the onset temperature of crystallization ($T_{C2}^{onset}$), a tangent is drawn against the baseline of the cooling run (C) at the temperatures above the crystallization peak. A second tangent is drawn against the point of inflection of the crystallization peak at temperatures above the temperature at the minimum of the crystallization peak. The two tangents are extrapolated until they intersect. The vertical extrapolation of the intersection to the temperature axis indicates the onset temperature of crystallization ($T_{C2}^{onset}$).

The sintering window (W) results from the difference between the onset temperature of melting ($T_{M2}^{onset}$) and the onset temperature of crystallization ($T_{C2}^{onset}$). Thus:

$$W = T_{M2}^{onset} - T_{C2}^{onset}$$

In the context of the present invention, the terms "sintering window (WSP)", "size of the sintering window (WSP)" and "difference between the onset temperature of melting ($T_{M2}^{onset}$) and the onset temperature of crystallization ($T_{C2}^{onset}$)" have the same meaning and are used synonymously.

The sinter powder (SP) of the invention is of particularly good suitability for use in a sintering method.

Shaped Bodies

The process of the invention affords a shaped body. The shaped body can be removed from the powder bed directly after the solidification of the sinter powder (SP) molten on exposure in step iis) or iif). It is likewise possible first to cool the shaped body and only then to remove it from the powder bed. Any adhering particles of the sinter powder (SP) that have not been melted can be mechanically removed from the surface by known methods. Methods for surface treatment of the shaped body include, for example, vibratory grinding or barrel polishing, and also sandblasting, glass bead blasting or microbead blasting.

It is also possible to subject the shaped bodies obtained to further processing or, for example, to treat the surface.

If step is-1) has been conducted, the shaped body additionally typically comprises the IR-absorbing ink.

It will be clear to those skilled in the art that, as a result of the exposure of the sinter powder (SP), components (A), (B) and any (C) and any (D) and (E) can enter into chemical reactions and be altered as a result. Such reactions are known to those skilled in the art.

Preferably, components (A), (B) and (C) and any (D), (E) and (F) do not enter into any chemical reaction on exposure in step ii); instead, the sinter powder (SP) merely melts.

The invention is elucidated in detail hereinafter by examples, without restricting it thereto.

EXAMPLES

The Following Powders are Used:

Powder (P1)
First polyamide component (PA1) comprising 78.6% by weight of PA6 (nylon-6, Ultramid® B27E, BASF SE), 21% by weight of PA6 I/6T (nylon-6I/6T, Grivory G16, EMS) and 0.4% by weight of Irganox 1098® (component (D), N,N'-hexane-1,6-diylbis(3-(3,5-di-tert-butyl-4-hydroxyphenylpropionamide)), BASF SE), percentages by weight based in each case on the total weight of component (A)

Powder (P2)
Second polyamide component (PA2) comprising 78.5 weight of PA66 (nylon-6,6, Ultramid® A27, BASF SE), 21% by weight of PA6 I/6T (nylon-6I/6T, Grivory G16, EMS) and 0.5% by weight of Irganox 1098@ (component (D), N,N'-hexane-1,6-diylbis(3-(3,5-di-tert-butyl-4-hydroxyphenylpropionamide)), BASF SE), percentages by weight based in each case on the total weight of component (B)

Powder (P3)
Powder (P3) is a mixture of 75% by weight of powder (P1) with 25% by weight of glass beads (Spheriglass 3000 CPO3, Potters).

Table 1 reports the particle sizes and also melting points and crystallization temperatures of powders (P1), (P2), (P3) and of a 70:30 mixture and of a 50:50 mixture of (P1) and (P2).

Powders (P1), (P2), (P3) and mixtures of powders (P1) and (P2) were used to produce shaped bodies (80 mm×10 mm×4 mm sintered specimens) by selective laser sintering. The construction space temperature was 200° C.; the energy input of the laser was 40 mJ/mm².

The measurement results for the sintered specimens are shown in table 2.

Particle sizes, melting points and crystallization temperatures were determined as described above in the description.

The softening temperature "Vicat B50" was determined as follows: measurement to ISO 306:2013 at a heating rate of 50 K/h, sample thickness 4 mm and silicone oil as heat transfer medium.

The heat deflection temperature "HDT" was determined as follows: measurement to ISO 72-2:2013 at a heating rate of 120 K/h, span 64 mm, dried samples (80° C., reduced pressure, 336 hours).

TABLE 1

| Example | D50 [μm] | D90 [μm] | $T_M1$ [° C.] | $T_C1$ [° C.] | $T_M2$ [° C.] | $T_C2$ [° C.] |
|---|---|---|---|---|---|---|
| P1 | 47.0 | 75.0 | 117.0 | 218.0 | 173.0 | — | — |
| P2 | 17.9 | 45.1 | 84.3 | — | — | 258.0 | 224.0 |
| P3 | n.d. | n.d. | n.d. | 218 | 175 | — | — |
| P1/P2 50/50 | 35.1 | 67.8 | 116.1 | 217.9 | 178.2 | 257.5 | 212.0 |
| P1/P2 70/30 | n.d. | n.d. | n.d. | 219.4 | 174.2 | 256.5 | 214.5 | from the sinter powders (SP) of the invention. EB1 shows the ultimate strength of a sintered specimen that has been prepared from a P1:P2 powder mixture of 85:15% by weight. Inventive example EB4 shows the ultimate strength of a sintered specimen that has been prepared from a P1:P2 powder mixture of 80:20% by weight. Inventive example EB2 shows the strength of a sintered specimen that has been prepared from a sinter powder (SP) P1:P2 of 70:30% by weight.

For the inventive examples, ultimate strength was measured in the dry state to ISO 527-2:2012. For sintered specimens that have been produced from pure PA6 powder, a ultimate strength of 57.7 MPa was ascertained. For the sintered specimens that have been produced by laser sintering of the inventive powder mixtures EB1, EB2 and EB4, ultimate strengths of 51.8, 42 and 47.9 MPa respectively were ascertained. Thus, based on sintered specimens that have been produced from pure PA6 powder, the decrease in ultimate strength is only 10.2%, 27.2% and 17.0% respectively, and hence much lower than in the case of sintered

TABLE 2

| Example | P1 [% by wt.] | P2 [% by wt.] | P3 [% by wt.] | Vicat B50 [° C.] | HDTA [° C.] | Sintered specimen | Sintered specimen | $T_C1$ [° C.] Sintered specimen | $T_C2$ [° C.] Sintered specimen | Color Sintered specimen | Separation Powder |
|---|---|---|---|---|---|---|---|---|---|---|---|
| VP1 | 100.0 | — | — | 193.0 | 98.0 | 220.7 | n.d. | 170.9 | n.d. | white | no |
| EB1 | 85.0 | 15.0 | — | n.d. | n.d. | n.d. | n.d. | n.d. | n.d. | white | no |
| EB2 | 70.0 | 30.0 | — | 198.1-199.6 | n.d. | 219.4 | 258.5 | 174.2 | 214.5 | white | no |
| EB3 | 50.0 | 50.0 | n.d. | n.d. | n.d. | n.d. | n.d. | n.d. | n.d. | white | no |
| EB4 | 80.0 | 20.0 | — | n.d. | n.d. | n.d. | n.d. | n.d. | n.d. | n.d. | n.d. |
| VP2 | — | 100.0 | — | 224.0 | n.d. | 259.1 | n.d. | 225.3 | n.d. | dark brown | no |
|  | — | — | 100.0 | 194.0 | 104.0 | 219.5 | n.d. | 172.1 | n.d. | white-greenish | yes |

The DSC measurements on the sintered specimens show that the co-melting has given rise to partly compatible mixtures. This becomes clear from an increase in the first crystallization temperature $T_C1$ and a lowering of the second crystallization temperature $T_C2$. The Vicat softening temperature is higher for EB2 than for VP1; it is additionally higher than in the case of VP3. In the case of the sinter powders (SP) of the invention, moreover, no separation of the powders was observed, as is the case for VP3. White sintered specimens are obtainable from the sinter powders (SP) of the invention.

The prior art (Mechanical properties of PA6/PA12 blend specimens prepared by selective laser sintering, Polymer Testing 31 (2012) 411-416, doi:10.1016) describes the mechanical properties of shaped bodies that have been produced by selective laser sintering from polyamide powders. This document compares the mechanical properties of pure PA6 powder and pure PA12 powder with PA6/PA12 powder mixtures. This document discloses that, in the case of a 50:50 polyamide powder mixture of PA6:PA12, a deterioration in impact resistance of 78% is measured, based on the ultimate strength of a shaped body which is produced from a pure PA12 powder. For a polyamide powder mixture PA6/PA12 of 20:80, a deterioration in ultimate strength of 47% is observed, likewise based on the ultimate strength of a shaped body that has been produced from a pure PA12 powder.

Table 3 below shows the test results for the ultimate strengths for sintered specimens that have been produced from pure PA6 powder (see comparative example VP1) or specimens that have been produced from powder mixtures according to the prior art. The determination of the ultimate strength of a sintered specimen that has been produced from a pure PA66 powder (see VP2) was not possible in the present case since the sintering of the powder (VP2) gave only very poor, highly discolored and hence untestable sintered specimens.

TABLE 3

| Example | P1 [% by wt.] | P2 [% by wt.] | Ultimate strength [MPa] | Standard deviation in ultimate strength [MPa] |
|---|---|---|---|---|
|  | 100.0 | — | 57.7 | 2.0 |
| EB1 | 85.0 | 15.0 | 51.8 | 1.0 |
| EB2 | 70.0 | 30.0 | 42.0 | 1.8 |
| EB4 | 80.0 | 20.0 | 47.9 | 2.0 |
| VP2 | — | 100.0 | n.d. | n.d. |

The invention claimed is:

1. A sinter powder (SP) comprising the following components:
    (A) at least one first polyamide component (PA1) comprising, based on the total weight of the first polyamide component (PA1), at least 50% by weight of a first aliphatic polyamide (aPA1), where the first polyamide component (PA1) has a first melting point ($T_M1$) and where the first aliphatic polyamide (aPA1) has been formed from repeat units having a first ratio (V1) per repeat unit of $CH_2$ groups to NHCO groups in the range from 4 to 6, (B) at least one second polyamide component (PA2) comprising, based on the total weight of the second polyamide component (PA2), at least 50% by weight of a second aliphatic polyamide (aPA2), where the second polyamide component (PA2) has a second melting point ($T_M2$) and where the second aliphatic polyamide (aPA2) has been formed from repeat units having a second ratio (V2) per repeat unit of $CH_2$ groups to NHCO groups in the range from 4 to 6, wherein the second melting point ($T_M2$) is higher than the first melting point ($T_M1$) and where the quotient (Q) of the numerical value of the second ratio (V2) divided by the numerical value of the first ratio (B1) is in the range of 0.6 to 1.5.

2. The sinter powder (SP) according to claim 1, wherein the differential between second melting point ($T_M2$) and first melting point ($T_M1$) is in the range from 20 to 70 K.

3. The sinter powder (SP) according to claim 1, wherein the second melting point ($T_M2$) is in the range from 170 to 300° C. and the first melting point ($T_M1$) is in the range from 150 to 280° C.

4. The sinter powder (SP) according to claim 1, wherein the sinter powder (SP) comprises:
   5% to 95% by weight of component (A),
   5% to 95% by weight of component (B),
   0% to 5% by weight of at least one free flow aid,
   0% to 5% by weight of at least one additive and
   0% to 40% by weight of at least one reinforcer,
   based in each case on the total weight of the sinter powder (SP).

5. The sinter powder (SP) according to claim 1, wherein the first ratio (V1) is in the range from 4.5 to 5.5, and
   the second ratio (V2) is in the range from 4.5 to 5.5, and
   the quotient (Q) is in the range from 0.8 to 1.2.

6. The sinter powder (SP) according to claim 5, wherein the first ratio (V1) is in the range from 4.8 to 5.2, the second ratio (V2) is in the range from 4.8 to 5.2, and the quotient (Q) is in the range from 0.9 to 1.1.

7. The sinter powder (SP) according to claim 5, wherein the first ratio (V1) is in the range from 4.9 to 5.1, the second ratio (V2) is in the range from 4.9 to 5.1, and the quotient (Q) is in the range from 0.96 to 1.04.

8. The sinter powder (SP) according to claim 5, wherein the first ratio (V1) is in the range from 4.95 to 5.05, the second ratio (V2) is in the range from 4.95 to 5.05, and the quotient (Q) is in the range from 0.98 to 1.02.

9. The sinter powder (SP) according to claim 1, wherein the first aliphatic polyamide (aPA1) is at least one aliphatic polyamide selected from the group consisting of PA6/66, PA6 and PA66/6 and
   the second aliphatic polyamide (aPA2) is at least one aliphatic polyamide selected from the group consisting of PA6, PA66/6 and PA66.

10. The sinter powder (SP) according to claim 1, wherein the first polyamide component (PA1) comprises 50% to 90% by weight of the first aliphatic polyamide (aPA1) selected from the group consisting of PA6/66, PA6 and PA66/6 and 10% to 50% by weight of a first (semi)aromatic polyamide (arPA1), based on the total weight of the first polyamide component (PA1), and the second polyamide component (PA2) comprises 50% to 90% by weight of the second aliphatic polyamide (aPA2) selected from the group consisting of PA6, PA66/6 and PA66 and 10% to 50% by weight of a second (semi)aromatic polyamide (arPA2), based on the total weight of the second polyamide component (PA2).

11. The sinter powder (SP) according to claim 1, wherein the sinter powder (SP) has a median particle size (D50) in the range from 10 to 250 μm.

12. The sinter powder (SP) according to claim 1, wherein the sinter powder (SP) has
   a D10 in the range from 10 to 60 μm,
   a D50 in the range from 25 to 90 μm and
   a D90 in the range from 50 to 150 μm.

13. The sinter powder (SP) according to claim 1, wherein the sinter powder (SP) has a sintering window ($W_{SP}$), where the sintering window ($W_{SP}$) is the difference between the onset temperature of melting ($T_{M2}^{onset}$) and the onset temperature of crystallization ($T_{C2}^{onset}$) and where the sintering window ($W_{SP}$) is in the range from 10 to 40 K.

14. The sinter powder (SP) according to claim 1,
   wherein the sinter powder (SP) comprises
   10% to 90% by weight of component (A),
   10% to 90% by weight of component (B),
   0.1% to 1% by weight of at least one free flow aid,
   0.1% to 2.5% by weight of at least one additive, and
   0% to 40% by weight of at least one reinforcer,
   based in each case on the total weight of the sinter powder (SP).

15. A method of producing a shaped body, comprising the steps of:
   is) providing a layer of the sinter powder (SP) according to claim 1,
   iis) exposing the layer of the sinter powder (SP) provided in step is) in order to form the shaped body.

16. A method of producing a shaped body, comprising the steps of:
   if) melting the sinter powder (SP) according to claim 1,
   iif) depositing the molten sinter powder (SP) in a construction space in order to form the shaped body.

17. The method of producing a shaped body according to claim 16, further comprising: sintering the powder of claim 1 or utilizing the powder of claim 1 by extrusion through a nozzle in a fused filament fabrication method step.

18. A method of producing the sinter powder (SP) according to claim 1, comprising the steps of
   a) providing the first polyamide component (PA1)
   b) providing the second polyamide component (PA2)
   c) mixing the first polyamide component (PA1) and the second polyamide component (PA2).

19. The sinter powder (SP) according to claim 1, further comprising:
   (C) at least one free-flow aid,
   (D) at least one additive, and
   (E) at least one reinforcer.

* * * * *